May 23, 1967
R. DENES ET AL
3,320,746
FORWARD/REVERSE DRIVE
Filed Sept. 10, 1965
3 Sheets-Sheet 1
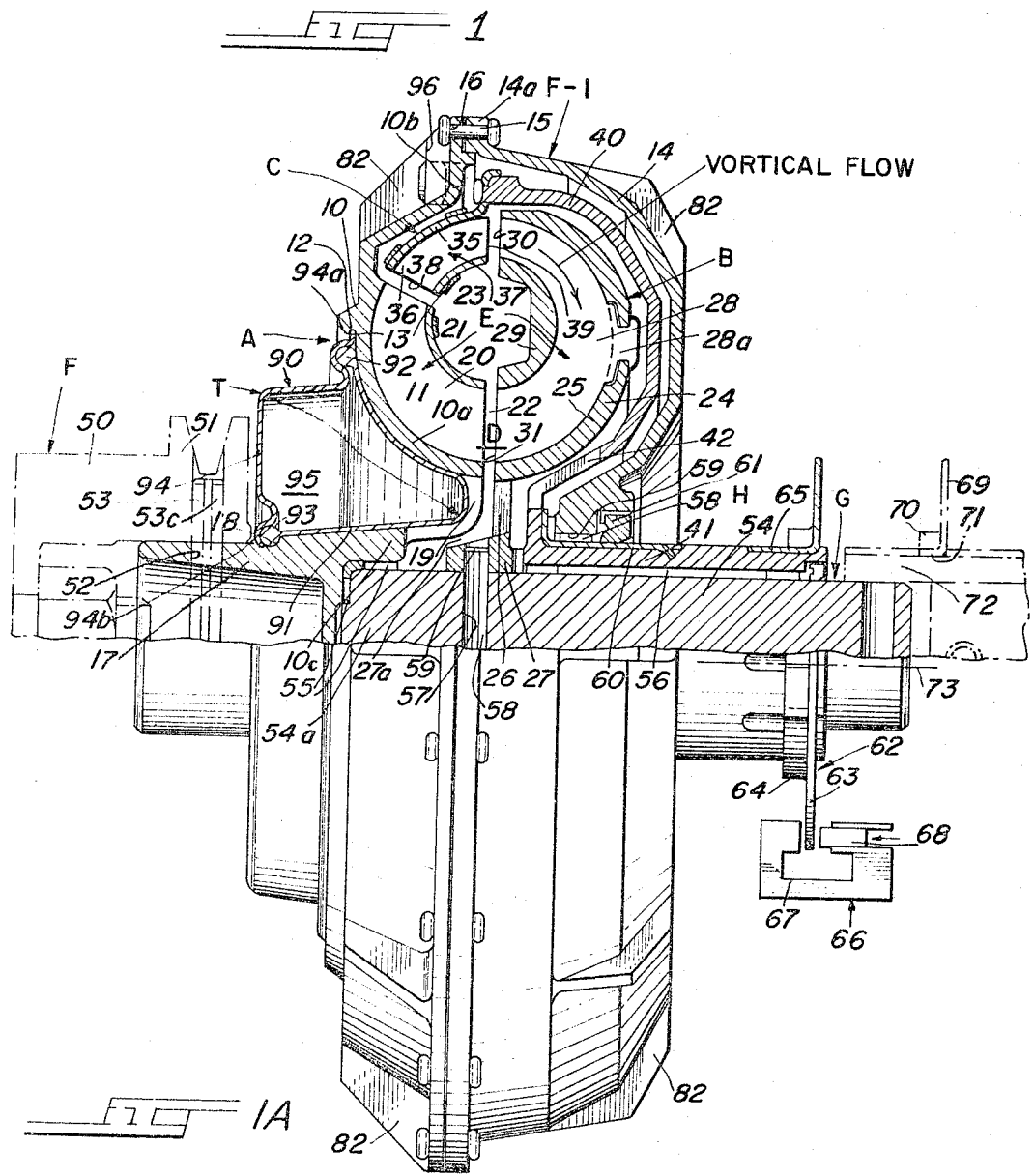
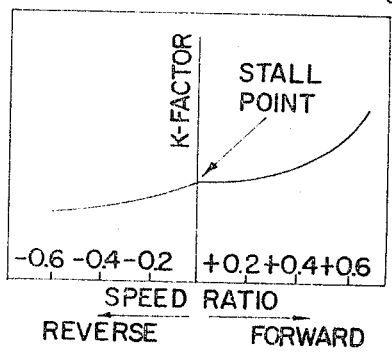
INVENTORS
ROBERT DENES
HERBERT A. McANINCH
BY
Joseph W. Malleck
ATTY

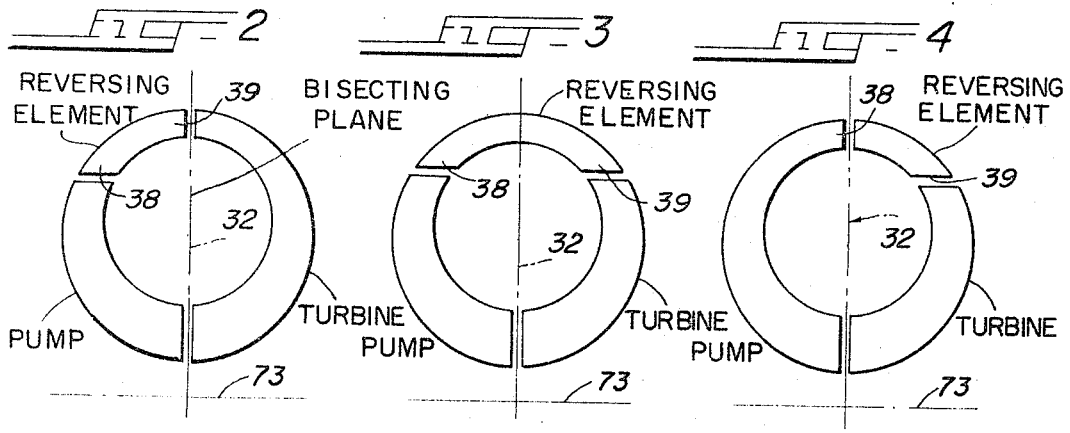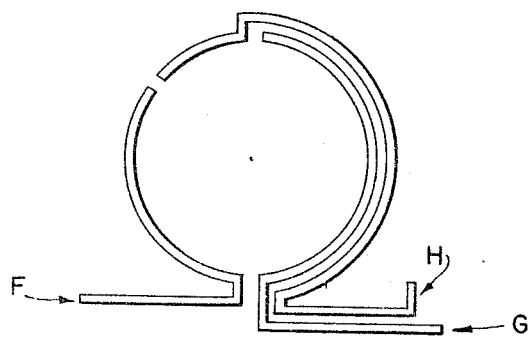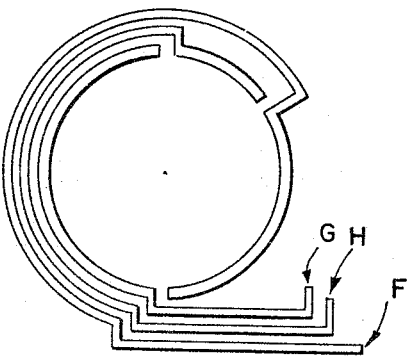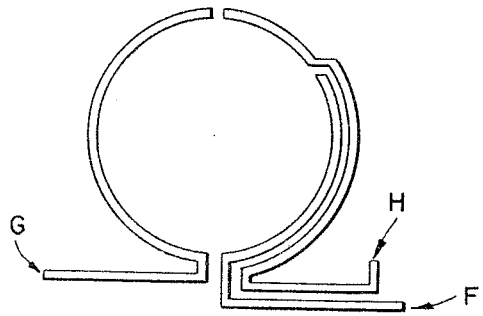
INVENTORS
ROBERT DENES
HERBERT A. McANINCH

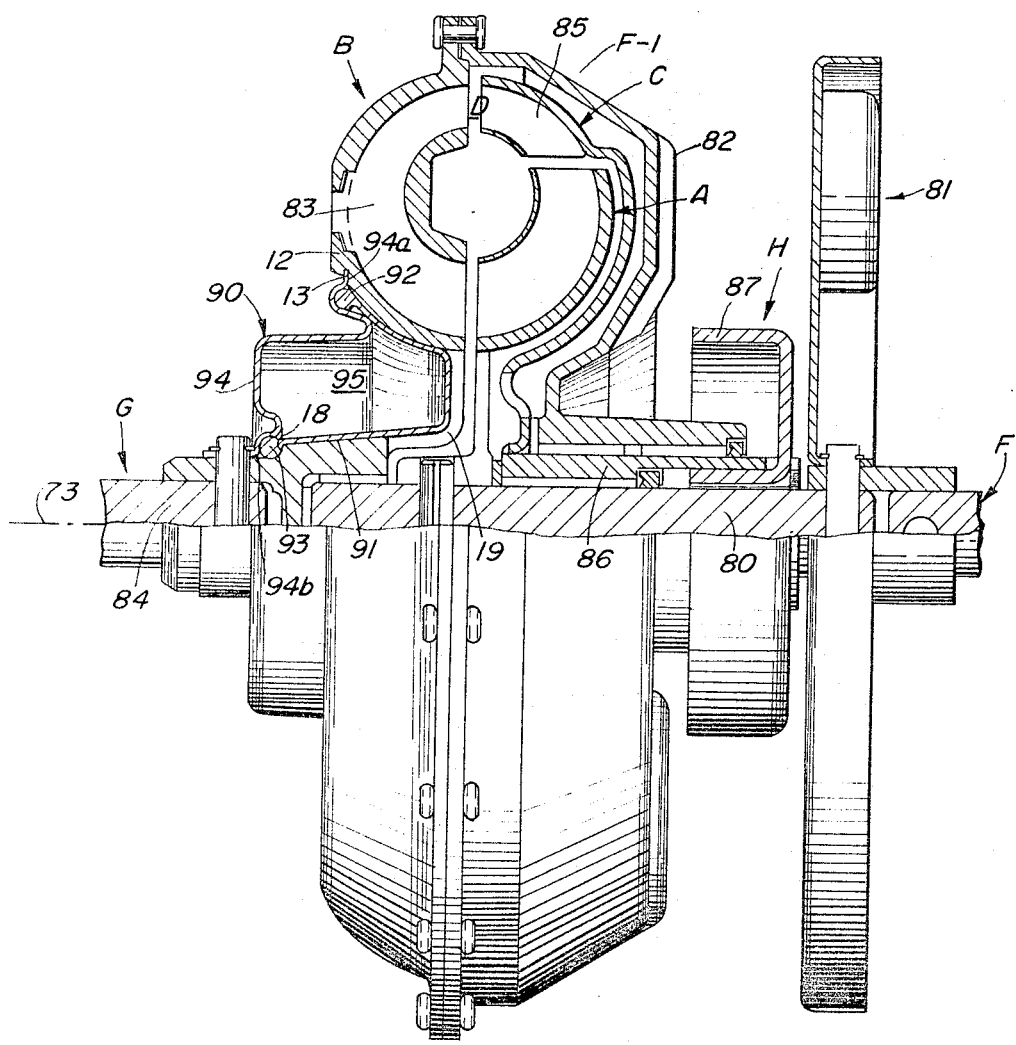

United States Patent Office 3,320,746
Patented May 23, 1967

3,320,746
FORWARD/REVERSE DRIVE
Robert Denes, Rockford, Ill., and Herbert A. McAninch, Auburn, Ind., assignors to Borg-Warner Corporation, Chicago, Ill., a corporation of Illinois
Filed Sept. 10, 1965, Ser. No. 486,269
10 Claims. (Cl. 60—54)

This invention relates to hydrokinetic devices and more particularly to such devices which are capable of providing forward and reverse drive conditions.

There is an increasing need for a more simple and economical transmission means which can be employed in such versatile applications as small tractors, powered carts and other types of vehicles where ease of maneuverability with smooth reversing of the direction of travel is important and where the efficiency of the drive, particularly in reverse, is not of prime importance.

Fluid reversing devices known to the art fall into three general categories: (a) devices which obtain rotative reversal of an output element by selectively introducing a normally exterior reaction blade cascade into the fluid chamber by movement of the cascade axially thereinto, (b) devices which temporarily obtain reversal of torque transmission (as opposed to simple rotative reversal) by introducing a normally exterior blade cascade to add to and change the effect of a continuously present, interior reactor, and (c) devices which change the function of normally interior turbine and reactor elements by holding the reactor element while connecting the turbine to an output for forward drive and by holding the turbine while connecting the reactor element to an output for reverse drive. Devices which require mechanical movement of a blade cascade into and out of the fluid flow circuit present a greater likelihood of mechanical difficulties in service; in those known devices which continuously employ interior bladed elements, and extended clutch system is necessary to provide for the switching of the various connections. It is to be greatly desired that reversal of rotation of an output shaft be accomplished entirely hydraulically within the fluid device accompanied only by operation of a simple external brake.

Therefore, it is a primary object of this invention to provide a fluid device which can be smoothly shifted between forward and reverse drive conditions by operation of a single external friction device, the slip of reversal being taken up solely within the fluid device without any interruption of the regular flow of power between the input and output thereof and without movement of auxiliary blading into or out of the fluid circuit. It is also an object of this invention that such device provide an improvement in economy and simplicity of manufacture justifying the employment of such devices in small equipment having more stringent cost limitations.

Specific structural features pursuant to the above objects is the provision of a hydrokinetic fluid coupling with three working bladed elements cooperatively arranged to form a closed fluid torus for circulating fluid in a unidirectional rotational manner, one of the elements being a reversing element interposed between the fluid exit of an impeller and the fluid entrance of a turbine and disposed in a generally radially outermost portion of the torus; brake means is provided for selectively permitting the reversing element to rotate freely in the fluid torus thereby promoting a forward drive between the impeller and turbine and for holding the reversing element to bend the fluid leaving the impeller and promote a reverse rotation of the turbine. Pressure compensating means may be provided for overcoming thermal effects upon the entrapped fluid within the torus, the totally enclosed fluid device permits the use of inexpensive seals between the respective rotatable elements.

Other objects and advantages of this invention will become more apparent from the following detailed description taken in connection with the accompanying drawings in which:

FIGURE 1 is an elevational view of a hydrokinetic transmission device embodying the principles of this invention and having certain portions thereof broken away and illustrated in a cross-sectional condition;

FIGURE 1a is a graphical illustration of some operative data for the structure of FIGURE 1;

FIGURES 2–4 illustrate schematically various arrangements of the bladed elements of the device while still encompassing the invention herein;

FIGURES 5–7 illustrate various alternative arrangements of the rotative input means, rotative output means, and reactor means for the device of this invention; and FIGURE 8 is an elevational view of still another alternative embodiment having certain portions thereof broken away and illustrated in cross-sectional view.

Turning now to the drawings and more particularly to FIGURE 1, there is illustrated a preferred form of this invention and broadly comprises a hydrokinetic device having a plurality of rotatable elements A, B, and C (corresponding to an impeller or pump, a turbine, and a reactor respectively) cooperatively associated together to define a toroidal chamber D, with fluid guidance means E on each of the respective elements effective to circulate fluid in said chamber. Rotary input means F is drivingly associated with the pumping or impeller element A and in the preferred embodiment a housing F–1 is carried by the pumping element for rotation therewith. A rotary output means G is drivingly associated with the turbine B and extends outwardly from a side of said device opposite from that of the input means F. A selective holding means H is employed and is associated with the reactor or reversing element C, the operation of which is effective to promote forward or reverse rotation of said turbine B. A pressure compensating means T is associated with the closed fluid chamber D.

Turning now in more particularity to the components of the device, the pumping or impeller element A is formed from a casting 10 which also integrally provides for a portion of the housing F–1 as well as providing for a portion of the rotary input means F. The casting 10 has a semi-toroidal outer wall 10a forming the pumping element shell and has a radially outwardly extending flange 10b which envelopes the reactor or reversing element C. The casting 10 has a return bent portion 10c extending from the radially innermost terminal of wall 10a to provide a hub. The interior surface 11 of wall 10a is smooth; an annular shoulder is defined on the outer surface of wall 10a with an annular slot 13 formed on an interior side; a plurality of impeller blades 20 are attached to surface 11 and are bounded by an inner core member 21. The element A has a fluid entrance at 22 and a fluid exit at 23, with the vortical flow about the core, of which the member 21 forms a part, moving as shown in FIGURE 1. The outwardly extending flange 10b is adapted to mate with another semi-toroidal portion 14 to complete housing F–1; housing portion 14 has a flange 14a coupled to flange 10b by suitable fasteners 15 extending through radially aligned and circumferentially spaced openings 16 in each of the mating flanges. Hub 10c has a sleeve 17 provided with an annular recess 18; openings 19 are circumferentially spaced about the hub 10c for communicating the chamber D with the exterior of said hub.

Turbine element B comprises a cast outer shell 24 defining a smooth semi-toroidal interior surface 25 with an integrally cast hub 27 formed at the radially innermost termination of the shell; hub 27 has circumferentially spaced openings 26 therein and is provided with a relatively short sleeve portion 27a at the innermost portion effective to be drivingly keyed to the rotary output means G. Turbine blades 28, forming part of fluid guidance means E, are mounted on wall 24 by suitable means, here being integral expanded rivets 28a, the blades carry an inner core member 29 cooperating with means E. Fluid entrance 29 and exit 30 is provided for the turbine as shown in FIGURE 1.

The reactor or reversing element C has a sheet metal outer shell 35 carrying appropriate blades 36, forming part of the guide means, and has an inner core or shroud member 37; the reversing element is interposed between the turbine and pumping elements and placed at a radially outermost sector of the toroidal chamber D. Fluid entrance 38 and exit 39 are provided. The outer shell 35 is carried by a cast member 40 complementary in shape to wall 24 and housing portion 14 and is nested in spaced relation therebetween.

The cast member 40 is integrally joined to a central quill shaft 41 for rotative support, the latter forming part of the selective holding means H. Fluid communicating ports 42 are formed in the innermost portion of member 40.

The rotary input means F may comprise, as shown in phantom outline in FIGURE 1, a drum-shaped sheave 50 having an annular V-shaped groove 51 for receiving rotary input power from such means as a belt. The sheave may be journalled for rotation by a shaft (not shown) and drivingly keyed to hub 10c forming part of the input means and also forming a part of the cast member 10. Radially aligned openings 52 are provided in each of said hub 10c and sheave 50 for reception of a roll pin 53 therein; thus, the sheave 50, cast member 10, and housing portion 14 rotate together. The rotary output means G comprises a solid shaft 54 having a nose 54a journalled in a recess of hub 10c by way of roller bearings 55 effective to take up axial thrust and radial loads. A sleeve-like bushing 56 is mounted about the solid shaft 54 for journalling quill shaft 41 thereon; shaft 54 is drivingly keyed for rotation with hub 27 of the turbine B by way of radially aligned openings 57 on each of said hub and shaft for receiving a roll pin 58 therein. The means H for retarding free rotation of the reversing element C, comprises quill shaft 41 having one end integrally connected to element C. The quill shaft 41 is carried by the output shaft 54 for relative rotation therewih and is effecive to journal the radially inner portion of housing portion 14 by way of roller bearings 58 between annular wall 59 of the portion and a hardened wear tube 60 integrally cast into the quill shaft 41. Inexpensive annular fluid seals 61 may be employed between housing portion 14 and wear tube 60 and between shafts 41 and 54. The means H further comprises a brake device 62 comprising a sheet metal disc 63 having a radially inner neck 64 provided with deformed fingers 65 for reception in grooves defined in the outer end of the quill shaft 41; the brake disc 63 is thereby keyed for rotation with quill shaft 41. The brake means 62 may further be comprised of a caliper type friction assembly 66 having a caliper 67 surrounding at least a portion of the outer periphery of disc 63 and having an actuating element 68 for imparting a frictional force against the disc for selectively retarding rotation thereof. A brake means similar to 66 may be employed on the output shaft for preventing creep of the turbine element during an idling condition of the vehicle. To this end, a sheet metal disc 69 may be employed having a neck 70 provided with deformed fingers 71 fitting in complementary shaped grooves in an auxiliary shaft portion 72 keyed to the output shaft 54; disc 69 may be selectively braked or retarded from rotation by means similar to that of 66.

In operation of the preferred embodiment of FIGURE 1, a forward drive condition can be effected by selecting means H to permit free rotation of the reversing element C within toroidal chamber D as moved by fluid forces. In such condition, rotative drive is imparted to the impeller in one designed rotative direction and stimulates a circulatory flow pattern within the toroidal chamber D which has, for purposes of explanation, two general flow components, one being a vortical flow about the core members of each of the bladed elements (as shown in FIGURE 1) and a circulatory movement about an axis 73 which is the general rotative axis of the device. Accordingly, the fluid flow leaving the pumping or impeller element will have two mutually perpendicular velocity components; one of the components being in a plane containing the axis 73 (this velocity component is called the meridional velocity); the other component is in a plane perpendicular to the axis 73 (and is called the peripheral velocity). The directional sense of the peripheral velocity at the impeller exit 23 coincides always with the sense of rotation of the pumping element which is referred to herein as a forward rotation, and, therefore, tends to drive the cascade of blades 36 of the reversing element in the forward direction which is identical to the rotation of the impeller. With means H in a condition permitting free or floating movement of the reversing element C, it will not absorb substantial kinetic energy for the fluid circulating in the toroidal chamber D. Therefore, the sense or direction of the peripheral velocity component of the fluid leaving the reversing blade cascade will be the same as the sense of direction of the peripheral velocity component of the fluid leaving the impeller. The peripheral velocity component, leaving the reversing element, will attempt to impart a forward rotation to the bladed element following the reversing element, in the turbine. Thus, when the reversing element, which is located between the impeller exit 23 and the fluid entrance 30 of the turbine, is rotating without essential restraint, the turbine will also rotate forwardly; the operation in the forward condition is similar to the operation of a fluid coupling.

To effect a shock free and smooth reversal of rotation of the turbine, means H must be selected to provide a retardation of disc 63 by forcing the friction element 68 thereagainst thus progressively restricting the movement of reversing element C. The blades 36 of the reversing element are adapted to change the sense of direction of the peripheral velocity component of the fluid flow by approximately 180 degrees from the direction of the peripheral velocity component of the flow leaving the impeller exit 23. This substantially changed peripheral velocity component will impart a reverse rotation to the element following the reversing element (namely the turbine) with the fluid differential greater on the surface of blades 28 opposite from that in the forward condition. Thus, when the reversing element C is essentially restrained from rotation, the turbine will rotate in a direction opposite to the rotation of the impeller. It follows, therefore, that there are essentially two distinct modes of operation of the fluid device; the first mode is a forward rotation of the turbine element when the reversing element is permitted to freely rotate under influence of fluid flow in the chamber D and the other mode is a reverse rotation of the turbine element B when the reversing element C is restrained from rotation. Between these two distinct modes of operation, there is a transient point, when, by permitting a progressive degree of slip of disc 63 in the control or operation of caliper means 66, the turbine can be completely stopped from rotation. This transient point of operation may be used in certain applications where temporary stopping of the turbine may be considered useful or mandatory.

To illustrate the scope of desirable placement of the reversing element with relationship to the impeller and turbine, reference is now made to FIGURES 2-4. FIGURE 2 is a schematic illustration of the elements as appearing in the preferred embodiment of FIGURE 1 and in which the fluid entrance and exit 38 and 39 respectively of the reversing element lie on one side of a plane which bisects the toroidal chamber D and is perpendicular to axis 73. FIGURE 4 illustrates a reversed structural arrangement of the reversing element of that of FIGURE 2 wherein the fluid entrance and exit of the reversing element are located substantially to an opposite side of the bisecting plane. In each instance, the fluid exit of the pump and fluid entrance of the turbine are substantially adjacent the respective fluid entrance and exit of the reversing element. FIGURE 3 shows a variation where the fluid entrance of the reversing element is on one side of the bisecting plane 32 and the fluid exit is on the opposite side. In each of the arrangements of FIGURES 2-4, the reversing element is located in the generally radially outermost portion of the toroidal chamber and each of the elements have blades which together substantially provide fluid guidance throughout the entire circulating chamber D. The fluid flow through the impeller and turbine of each of the variations of FIGURES 2-4 is a mixture of radial and axial flow; the flow through the reversing element in FIGURES 2 and 4 is substantially radial taken with respect to axis 73 and is substantially axial taken with respect to the axis as shown in FIGURE 3. All three of these arrangements will provide reversing of the turbine element as previously described. However, there is some difference not only in structure but in operation of these arrangements which results in a difference in a rotational speed of the reversing element when free to rotate in the forward drive condition.

Construction of a fluid device as herein described will provide a reversing mechanism for a transmission which will be substantially smooth in the transition between the different drive conditions. This is reflected in the K-factor of such device (K-factor being input speed divided by the square root of input torque) as plotted against the speed ratio (see FIGURE 1a). It can be noted that in the forward drive condition, wherein the speed ratio is positive, the K-factor curve is initially flat with a gradual rise at higher speed ratios. In the reverse drive condition, the K-factor drops off initially a little as higher speed ratios are achieved but is not substantially different. The zero point between the positive and the negative speed ratios of the graph of FIGURE 1a is generally a double point (not shown); there is a discontinuity by passing through the zero point in each direction of operation. We shall call this double zero point the stall point. Approaching stall while in the forward drive condition, the turbine will stall out while the reversing element freely rotates. Approaching stall from the reverse drive condition, the turbine will stall out while the reversing element is restrained from rotation. Since it is an object of this invention to provide a smooth reversal, this discontinuity of stall must be reduced as much as possible (the turbine cannot be doing two things at once). To this end, the torque absorbing capacity of the fluid device (which is normally represented by the expression of K-factor) is maintained substantially the same for both the forward and reverse stall points, and is illustrated in FIGURE 1a. For practical purposes of this device, the value of the stall K-factor for reverse drive condition must not vary more than 20% from the stall K-factor for the forward drive condition and thereby avoid torsional shocks from the inertia of the rotary input means and accompanying drive line (not shown).

Although no specific description of the blade contours or geometry of the torus has been made herein; those skilled in the art will have no difficulty in selecting suitable torus channels for the particular application as well as selecting and calculating the appropriate blade angles for the blade cascades of each of the elements provided that general limitations of this invention are inhered to.

To illustrate the versatility of structural arrangement of the supporting members for the various bladed elements of the device as permitted by the substantially closed fluid chamber (as opposed to a continuously pressurized or charged fluid supply), reference is now made to FIGURES 5-7. In the variation shown in FIGURE 5, the rotary input means F has portions which extend outwardly from the device in one axial direction while the rotary output means G has portions extending outwardly from the device in an opposite direction with the selective holding means H having a portion thereof journalled about the rotary output means G and thereby extending outwardly from the same side of the device. In FIGURE 7, an analogous construction is shown wherein rotary input means F is adapted to journal portions of the selective holding means H which extends outwardly in the same direction from the device. In FIGURE 6, each of the rotary input, output, and selective holding means have portions concentrically journalled thereabout each other and extend outwardly from the device in the same axial direction.

In FIGURE 8, a still further structural variation of the invention herein is illustrated. The pumping or impeller element A is connected to an input shaft 80 which also carries a fan assembly 81 to provide cooling of the entrapped fluid within chamber D. The fan is effective to circulate about housing F-1 to assist cooling fins 82 integrally formed as part of the housing to condut heat away therefrom. The arrangement of cooling fins for the preferred embodiment is substantially the same as in FIGURE 8, except that the fins are greater in area since they lack the aid of a fan as positive circulation.

The turbine blade cascade 83 (as shown in FIGURE 8), is rigidly connected to the output shaft 84 while the reversing blade cascade 85 is connected to a hollow shaft 86 carrying a brake-drum 87. The selective braking means H may be utilized to apply a retarding force on drum 87 which will stop the reversing element C from rotation. Since during actual operation the fluid within the substantially closed and sealed chamber D will rise in temperature from hydraulic losses, a compensation means 90 may be provided. Such means 90 may comprise a flexible membrane 91 having one surface normally in communication with the fluid pressure of chamber D by way of circumferentially spaced openings 19 in the return bend or hub of the turbine (and, in the case of the preferred embodiment, in the element A). The inner and outer annular terminal portions 92 and 93 of the membrane are locked in place by way of an annular sheet metal bracket 94 mounted on a side of member 10 with an outer periphery 94a received in the slot 13 of the shoulder 12 and an inner periphery 94b received in recess 18. The bracket 94 defines an auxiliary expansion chamber 95 for the membrane. The auxiliary chamber is normally open to atmospheric pressure enabling fluid pressure of the chamber D to be equalized with that of the atmosphere. The compensating means 90 is located substantially close to the axis 73 of rotation so that the toroidal chamber will always be substantially filled with oil at any speed ratios of the coupling. The coupling may be suitably filled with oil through an axis opening 96 (see FIGURE 1) provided in the portion 10b. The provision of a substantially sealed circulating chamber along with the use of a pressure compensating means, makes possible the use of inexpensive shaft seals not designed for high fluid pressure conditions.

While we have described our invention in connection with one specific embodiment and other alternative suggestions thereof, it is understood that this is by way of illustration and not by way of limitation and the scope of our invention is defined solely by the appended claims which should be construed as broadly as the prior art will permit.

We claim:

1. A hydrokinetic transmission device comprising: a plurality of rotatable semi-toroidal shaped elements related together about a common axis to define a closed toroidal chamber for circulating fluid therein, said elenents defining at least one impeller, at least one turbine, and at least one reactor, each of said elements having fluid guidance means and each having a fluid entrance and exit with the respective entrances and exits of each of the elements being arranged closely adjacent whereby the guidance means may influence fluid flow substantially throughout the entire chamber, said toroidal chamber being substantially filled with fluid during all conditions of the operation, the guidance means of said reactor being disposed between the fluid exit of said impeller and the fluid entrance of said turbine, and means for selectively permitting said reactor to rotate freely for effecting a fluid coupling between said impeller and turbine in one rotative direction and to be held against rotation for effecting a reverse rotation of said turbine relative to the rotation of said impeller, said fluid guidance means being adapted so that the torque absorption capacity of the device (K-factor) does not vary more than 20% in either direction of rotation of said turbine.

2. A hydrokinetic transmission device as in claim 1 which further comprises rotative input means operatively connected with said impeller element and extending operatively from one side of said device, rotative output means operatively connected to said turbine element and having portions thereof concentrically disposed with respect to said input means, and means operatively associated with said reactor element effective to selectively hold said reactor element against rotation.

3. A hydrokinetic transmission device as in claim 2, in which said rotative output means extends outwardly from an opposite side of said device and apart from said input means with portions of said selective holding means being concentrically disposed about said rotative input means.

4. A hydrokinetic transmission device as in claim 3, in which portions of the selective holding means is concentrically disposed about said output means.

5. A hydrokinetic transmission device as in claim 2, in which said selective holding means particularly comprises a quill shaft having one end connected to said reactor element and an opposite end drivingly carrying a sheet metal disc extending radially outwardly therefrom, and a brake effective to selectively retard rotation of said disc.

6. A hydrokinetic transmission device as in claim 1, in which said device has a fluid housing surrounding at least certain of said elements and is carried by said impeller for rotation therewith, said housing being effective to cooperate in defining said closed chamber.

7. A hydrokinetic transmission device as in claim 1, in which said device has a fluid housing surrounding at least certain of said elements and is rotatively carried by said turbine element, said housing being effective to cooperate in defining said closed toroidal chamber.

8. A hydrokinetic transmission device as in claim 1, in which said device has a fluid housing surrrounding at least certain of said elements and is rotatively carried by said reactor, said housing being effective to cooperate in defining said closed toroidal chamber.

9. A hydrokinetic transmission device as in claim 1, in which said device further comprises means effective to compensate for pressure changes of said entrapped fluid while maintaining said closed condition of said chamber.

10. A hydrokinetic transmission device as in claim 9, in which said compensating means comprises an auxiliary chamber, and a membrane separating said auxiliary chamber from said toroidal fluid chamber normally communicating with the membrane, thereby maintaining the static fluid pressure generally at atmospheric pressure.

References Cited by the Examiner

UNITED STATES PATENTS

| 1,970,236 | 8/1934 | Kluge et al. | 60—54 |
| 2,015,212 | 9/1935 | Beaumont | 60—54 |
| 2,078,597 | 4/1937 | Beaumont | 60—54 |
| 2,205,794 | 6/1940 | Jandasek | 60—54 |

EDGAR W. GEOGHEGAN, *Primary Examiner.*